(12) United States Patent
Botros et al.

(10) Patent No.: US 8,378,025 B2
(45) Date of Patent: Feb. 19, 2013

(54) ADHESIVE COMPOSITION

(75) Inventors: Maged G. Botros, Liberty Township, OH (US); Charles S. Holland, Springboro, OH (US); Shao Hua Guo, Exton, PA (US)

(73) Assignee: Equistar Chemicals, LP, Houston, TX (US)

( * ) Notice: Subject to any disclaimer, the term of this patent is extended or adjusted under 35 U.S.C. 154(b) by 280 days.

(21) Appl. No.: 12/661,209

(22) Filed: Mar. 12, 2010

(65) Prior Publication Data

US 2011/0223439 A1 Sep. 15, 2011

(51) Int. Cl.
*B32B 27/08* (2006.01)
*B32B 27/32* (2006.01)
*C09J 123/08* (2006.01)
*C09J 123/16* (2006.01)

(52) U.S. Cl. .......................................... 525/71; 525/74
(58) Field of Classification Search .................... 525/71, 525/74
See application file for complete search history.

(56) References Cited

U.S. PATENT DOCUMENTS

| 5,591,792 | A | * | 1/1997 | Hattori et al. ................. 524/271 |
| 5,709,953 | A | | 1/1998 | Goto et al. |
| 6,184,298 | B1 | | 2/2001 | Lee |
| 6,306,996 | B1 | | 10/2001 | Cecchin et al. |
| 6,716,928 | B2 | | 4/2004 | Botros |
| 6,855,432 | B1 | * | 2/2005 | Hojabr et al. ................. 428/461 |
| 2007/0167569 | A1 | | 7/2007 | Botros |

FOREIGN PATENT DOCUMENTS

| WO | WO 2007/040667 | 4/2007 |
| WO | WO 2008/018949 | 2/2008 |

* cited by examiner

*Primary Examiner* — Jeffrey Mullis

(57) ABSTRACT

Disclosed is an adhesive composition. The adhesive composition comprises from 30 wt % to 65 wt % of a polyolefin, 15 wt % to 65 wt % of a conjugated diene-based elastomer, 0.5 wt % to 15 wt % of an olefin elastomer, and 0.5 wt % to 25 wt % of a maleated polyolefin. The weight ratio of olefin elastomer to conjugated diene-based elastomer is within the range of 0.04 to 1. The adhesive of the invention has improved adhesion to styrenic polymer layer, barrier layer, and polyolefin layer. It is suitable for extruded multilayer films, sheets, and many other related applications.

15 Claims, No Drawings

ADHESIVE COMPOSITION

FIELD OF THE INVENTION

The invention relates to an adhesive composition. More particularly, the invention relates to an adhesive composition having improved adhesion to styrenic polymer surfaces.

BACKGROUND OF THE INVENTION

Multi-layer films and sheets are widely used for food packaging applications. Depending on the intended application, the number and arrangement of resin layers and the type of resins employed will vary. Polyethylene resins are often included as one of the layers for food contact and sealing properties. Ethylene-vinyl alcohol (EVOH) copolymers and polyamides (nylons) are widely used as oxygen and moisture barrier layers. Styrenic polymers are commonly included as structural layers, especially for thermoforming applications. Styrenic polymers which contain rubber, such as high impact polystyrene (HIPS), are especially useful for this purpose. However, adhering dissimilar resin layers in multilayer films and sheets is always challenging. While numerous tie-layer adhesive compositions containing modified polyolefins are effective in adhering polyolefin resin layer and barrier resin layers, they often lack adequate adhesion to styrenic resin layers.

U.S. Pat. No. 5,709,953 discloses an extrudable adhesive composition for bonding polystyrene resin to a second resin such as oxygen- or nitrogen-containing resins, such as EVOH, polyesters, and polyamides (nylon) or to non-polar resins, such as polyethylene. The extrudable adhesive comprises an ethylene polymer and styrene/aliphatic/styrene block copolymer. The reference discloses that all or a portion of the ethylene polymer fraction can be grafted with an unsaturated carboxylic acid or anhydride. Similarly, U.S. Pat. No. 6,184,298 discloses an adhesive composition which consists essentially of a polyethylene polymer and an unmodified styrene-based elastomer having an immeasurable Mooney viscosity.

There is a continuing need for adhesive compositions which provide improved adhesion to styrenic polymer layers in coextruded multi-layer films and sheets.

SUMMARY OF THE INVENTION

The invention relates to an adhesive composition. The adhesive composition comprises from 30 wt % to 65 wt % of a polyolefin, 15 wt % to 65 wt % of a conjugated diene-based elastomer, 0.5 wt % to 15 wt % of an olefin elastomer, and 0.5 wt % to 25 wt % of a maleated polyolefin. The weight ratio of olefin elastomer to conjugated diene-based elastomer in the adhesive composition is within the range of 0.04 to 1. The adhesive of the invention has improved adhesion to a styrenic polymer surface. It is suitable for extruded multilayer films and sheets and many other applications.

DETAILED DESCRIPTION OF THE INVENTION

The adhesive composition of the invention comprises from 30 wt % to 65 wt %, preferably from 35 wt % to 65 wt %, and more preferably from 45 wt % to 65 wt %, of a polyolefin. Suitable polyolefins for use in the adhesive composition of the invention include those made from one or more $C_2$ to $C_{10}$ α-olefin monomers. Preferably, the polyolefin is selected from the group consisting of polyethylenes, polypropylenes, polybutenes, the like, and mixtures thereof.

Suitable polyethylene includes ethylene homopolymers, copolymers of ethylene with at least one $C_3$ to $C_{10}$ α-olefin, the like, and mixtures thereof. They include high-density polyethylene (HDPE, density 0.941 g/cm³ or greater), low-density polyethylene (LDPE, density 0.910 g/cm³ to 0.925 g/cm³), medium-density polyethylene (MDPE, density 0.926 g/cm³ to 0.940 g/cm³), linear low-density polyethylene (LLDPE, density 0.910 g/cm³ to 0.925 g/cm³), the like, and mixtures thereof. Suitable polyethylene has a melt index ($MI_2$) (as determined by ASTM D-1238-01 at a temperature of 190° C. and at a load of 2.16 kg) preferably within the range of 0.01 dg/min to 150 dg/min, more preferably within the range of 0.01 dg/min to 10 dg/min, and most preferably within the range of 0.01 dg/min to 5 dg/min.

Suitable polypropylene includes amorphous polypropylene, semi-crystalline polypropylene, the like, and mixtures thereof. Preferably, the semi-crystalline polypropylene is selected from the group consisting of propylene homopolymers, copolymers of propylene with at least one other $C_2$ to $C_{10}$ α-olefin, the like, and mixtures thereof. Copolymers of propylene include random copolymers and impact copolymers. Preferred α-olefins for such copolymers include ethylene, 1-butene, 1-pentene, 1-hexene, methyl-1-butenes, methyl-1-pentenes, 1-octene, 1-decene, the like, and mixtures thereof. "Semi-crystalline," as used herein, means that the crystallinity is greater than or equal to 40%, preferably greater than or equal to 55%, and more preferably greater than or equal to 80%. Preferably, the semi-crystalline polypropylene has a melt flow rate (as determined by ASTM D-1238-01 at a temperature of 230° C. and at a load of 2.16 kg) within the range of 0.001 dg/min to 500 dg/min. Preferably, the semi-crystalline polypropylene has a density within the range of 0.897 g/cm³ to 0.925 g/cm³ and a weight average molecular weight (Mw) within the range of 85,000 to 900,000.

Suitable polybutene includes homopolymers of 1-butene, copolymers of 1-butene with at least one other $C_2$ to $C_{10}$ α-olefin, the like, and mixtures thereof. Preferred α-olefins for such copolymers include ethylene, propylene, 1-pentene, 1-hexene, methyl-1-butenes, methyl-1-pentenes, 1-octene, 1-decene, the like, and mixtures thereof. The polybutene has a melt index (as determined by ASTM D-1238, Condition E) preferably within the range of 0.01 dg/min to 1000 dg/min, more preferably within the range of 0.1 dg/min to 750 dg/min. Methods for producing polybutene are known. For instance, see U.S. Pat. No. 6,306,996, the teachings of which are herein incorporated by reference.

Polyethylene is a preferred polyolefin for use in the adhesive composition of the invention. LLDPE is more preferred. Suitable LLDPE include copolymers of ethylene and one or more $C_3$ to $C_{10}$ α-olefins. Suitable α-olefins include 1-butene, 1-hexene, and 1-octene, the like, and mixtures thereof. The density of LLDPE is preferably within the range of 0.865 to 0.925 g/cm³. LLDPE is commercially available, for instance GA502®, GA602® and GA616® LLDPE, from Equistar Chemicals, LP. Suitable LLDPE can be produced by Ziegler-Natta, single-site, or any other olefin polymerization catalysts. A particularly preferred LLDPE resin is a copolymer of ethylene and 1-butene having 1-butene content within the range of 2 to 20 wt %. The ethylene-1-butene copolymer preferably has a density from 0.912 to 0.925 g/cm³ and, more preferably, from 0.915 to 0.92 g/cm³. The ethylene-1-butene copolymer preferably has a melt indexes ($MI_2$) within the range of 0.5 to 15 g/10 min and, more preferably, from 1 to 10 g/10 min. In a particularly useful embodiment of the invention the ethylene-1-butene copolymer has a $MI_2$ from 1.5 to 5 g/10 min and density from 0.916 to 0.919 g/cm³. Densities and MI$_2$ are determined in accordance with ASTM 1505 and 1238 (condition 190/2.16), respectively.

The adhesive composition of the invention comprises from 15 wt % to 65 wt %, preferably from 25 wt % to 55 wt %, more preferably from 25 wt % to 45 wt %, and most preferably from 27 wt % to 35 wt %, of a conjugated diene-based elastomer.

By "conjugated diene-based elastomer," we mean any conjugated diene-containing polymers and copolymers which have a glass transition temperature (T$_g$) below room temperature (25° C.). In other words, the conjugated diene-containing polymers and copolymers are in elastomeric or rubber state at room temperature. Examples of conjugated diene-based elastomers include polybutadiene, polyisoprene, butadiene-vinyl aromatic random and block copolymers, isoprene-vinyl aromatic random and block copolymers, hydrogenated butadiene-vinyl aromatic block copolymers, hydrogenated isoprene-vinyl aromatic block copolymers, the like, and mixtures thereof. Preferably, the conjugated diene-based elastomers are selected from the group consisting of butadiene-styrene block copolymers, isoprene-styrene block copolymers, hydrogenated butadiene-styrene block copolymers, hydrogenated isoprene-styrene block copolymers, the like, and mixture thereof. More preferably, the conjugated diene-based elastomers are selected from the group consisting of styrene-butadiene-styrene triblock copolymers (SBS), styrene-isoprene-styrene triblock copolymers (SIS), the like, and mixtures thereof. SBS is particularly preferred.

The adhesive composition comprises from 0.5 wt % to 15 wt %, preferably from 1 wt % to 10 wt %, and more preferably from 1.5 wt % to 7.5 wt %, of an olefin elastomer.

By "olefin elastomer," we mean any olefin polymers or copolymers which have elastomeric characteristics. Suitable polyolefin elastomers include ethylene-propylene rubber, ethylene-acrylate rubber, ethylene-1-butene rubber, ethylene-propylene-diene rubber (EPDM), polyethylene plastomers, elastoplastic polypropylene or impact polypropylene, the like, and mixtures thereof. Preferably the polyolefin elastomers are selected from the group consisting of ethylene-propylene rubber, ethylene-1-butene rubber, EPDM, the like, and mixtures thereof. Ethylene-propylene rubber is particularly preferred.

The ethylene-propylene rubber preferably comprises from 35 wt % to 75 wt % of ethylene and from 25 wt % to 65 wt % of propylene, and more preferably from 45 wt % to 75 wt % of ethylene and from 25 wt % to 55 wt % of propylene. The ethylene-propylene rubber can optionally comprise other comonomers. Other suitable comonomers include 1-butene, 1-pentene, 1-hexene, 4-methyl-1-pentene, 1-octene, butadiene, isoprene, the like, and mixtures thereof. Suitable ethylene-1-butene based rubber preferably comprises from 35 wt % to 65 wt % of ethylene and from 35 wt % to 65 wt % of 1-butene, and more preferably from 45 wt % to 55 wt % of ethylene and from 45 wt % to 55 wt % of 1-butene. The ethylene-1-butene based rubber can optionally comprise other comonomers. Other suitable comonomers include propylene, 1-pentene, 1-hexene, 4-methyl-1-pentene, 1-octene, butadiene, isoprene, the like, and mixtures thereof. Suitable EPDM preferably comprises from 35 wt % to 75 wt % of ethylene, 25 wt % to 55 wt % of propylene, and 2 wt % to 10 wt % of a diene monomer. Suitable diene monomers for making EPDM are preferably selected from dicyclopentadiene, ethylidene norbornene, and vinyl norbornene.

The olefin elastomer is used in an amount effective to increase the adhesion of the adhesive to styrenic polymer surfaces. It is used in a weight ratio of olefin elastomer/conjugated diene-based elastomer within the range of 0.04 to 1, preferably within the range of 0.05 to 1, more preferably within the range of 0.05 to 0.25, most preferably within the range of 0.05 to 0.20, and particularly preferably within the range of 0.05 to 0.15.

The adhesive composition comprises from 0.5 wt % to 25 wt %, preferably 5 wt % to 20 wt %, and more preferably 5 wt % to 15 wt %, of a maleated polyolefin. Suitable maleated polyolefin for use in the invention include maleated HDPE, LDPE, LLDPE, propylene homopolymers, propylene random copolymers, propylene impact copolymers, the like, and mixtures thereof. Methods for maleating polyolefin are known. For instance, U.S. Pat. No. 6,716,928, the teachings of which are incorporated herein by reference, teaches maleating a propylene impact copolymer. Preferably, the maleated polyolefin is a maleated HDPE. Suitable HDPE for making maleated HDPE includes ethylene homopolymers and copolymers of ethylene and one or more C$_3$ to C$_{10}$ α-olefins. Suitable α-olefins include 1-butene, 1-hexene, and 1-octene, the like, and mixtures thereof. Preferably, the HDPE comprises less than 5 wt % of the C$_3$ to C$_{10}$ α-olefins. The density of HDPE is preferably within the range of 0.932 g/cm$^3$ to 0.965 g/cm$^3$ and more preferably within the range 0.952 g/cm$^3$ to 0.965 g/cm$^3$. The maleated polyolefin preferably contains from 0.1 wt % to 10 wt %, more preferably 0.5 wt % to 5 wt %, and most preferably from 1 wt % to 2.5 wt %, of grafted maleic anhydride.

The adhesive composition of the invention optionally comprises other additives, fillers, and modifiers. Suitable additives include foaming agents, cross-linking agents, nucleation agents, flame retardants, processing aids, antistatic agents, lubricants, optical brighteners, pigments, dispersants, water-blocking agents, UV absorbents and light stabilizers, the like, and mixtures thereof. Additives and fillers are used in an amount preferably within the range of 0.05 wt % to 35 wt %, more preferably within the range of 0.05 wt % to 15 wt %, of the adhesive composition.

The adhesive composition of the invention can be made by mixing the various components. Any suitable mixing methods known in the industry can be used. Melt blending is a preferred method. Melt mixing is preferably performed by extrusion.

The invention includes an article comprising the adhesive composition, including multilayer films and sheets, pipes, geomembranes, containers, automotive parts, and wire and cable insulations and jackets in which the adhesive composition is used as an adhesive layer. By multilayer, we mean that the article have at least two more layers besides the adhesive layer. The adhesive layer bonds the other layers together. One example of multilayer film is a five-layer film which has the structure of styrenic polymer/adhesive layer/EVOH/adhesive layer/polyethylene. Ethylene-vinyl alcohol copolymer (EVOH) layer is employed as a barrier to oxygen. Suitable polyethylenes for use in the multilayer films and sheets are the same as discussed above. Suitable styrenic polymers includes polystyrenes, high-impact polystyrenes, styrene-acrylonitrile copolymers, styrene-butadiene-acrylonitrile copolymers, styrene-olefin copolymers, styrene-maleic anhydride copolymers, styrene-acrylate copolymers, the like, and mixtures thereof. The articles of the invention can be made by many methods or processes. For instance, a multilayer film or sheet of the invention can be made by co-extrusion, coating, and other laminating processes.

The following examples merely illustrate the invention. Those skilled in the art will recognize many variations that are within the spirit of the invention and scope of the claims.

Comparative Example 1

An adhesive composition of the invention is prepared by melt-blending 59.8 parts by weight of an LLDPE having density of 0.918 g/cm$^3$ and melt index MI$_2$ of 2 g/10 min, 30 parts by weight of styrene-butadiene-styrene triblock copolymer (SBS) having 44 wt % styrene and 56 wt % of butadiene, 10 parts by weight of a HDPE grafted with 1.9 wt % maleic anhydride, and 0.2 part by weight of a hindered phenol stabilizer. The adhesive is coextruded with a styrenic polymer (50/50 blend of polystyrene and high impact polystyrene) and an EVOH resin having 32 mol % of ethylene to produce multi-layer coextruded film having 5 mils of total thickness and the following construction and weight percentage of each component:

| 41% Styrenic polymer | 3% Adhesive layer | 12% EVOH | 3% Adhesive layer | 41% Styrenic polymer |
|---|---|---|---|---|

The adhesion strength at the styrenic polymer/adhesive interface is 0.06 pound per linear inch (P/LI), determined in accordance with ASTM D 1876-93.

Comparative Example 2

The general procedure of Comparative Example 1 is followed except that 29 parts by weight of SBS and 1 part by weight of an ethylene-propylene rubber EPR (ratio of EPR/SBS:0.03) are used. The EPR contains 72 wt % of ethylene recurring units and 28 wt % of propylene recurring units and has a melt index of 1.0 g/10 min. The adhesion strength at the styrenic polymer/adhesive interface is 0.06 P/LI.

Examples 3-5

The general procedure of Comparative Example 2 is followed except that the ratios of EPR/SBS are 0.05, 0.1, and 0.2, respectively, in Examples 3, 4, and 5. The adhesion strength at the styrenic polymer/adhesive interface is 0.08 P/LI in Example 3, 0.13 P/LI in Example 4, and 0.07 P/LI in Example 5.

Examples 6-8

The general procedure of Comparative Example 1 is followed. In Examples 6-8, 30 parts by weight of SBS and various amounts of EPR are used. The amounts of each component and adhesion results are listed in Table 1.

Comparative Example 9

The general procedure of Comparative Example 1 is followed except that the SBS is replaced by the EPR in Comparative Example C2. The adhesion strength at the styrenic polymer/adhesive interface is 0.02 P/LI.

TABLE 1

EXPERIMENTAL RESULTS SUMMARY

| Ex. No. | C1 | C2 | 3 | 4 | 5 | 6 | 7 | 8 | C9 |
|---|---|---|---|---|---|---|---|---|---|
| Maleated HDPE (part by weight) | 10 | 10 | 10 | 10 | 10 | 10 | 10 | 10 | 10 |
| LLDPE (part by weight) | 59.8 | 59.8 | 59.8 | 59.8 | 59.8 | 57.3 | 54.8 | 52.3 | 59.8 |
| SBS (part by weight) | 30 | 29 | 28.5 | 27.5 | 25 | 30 | 30 | 30 | 0 |
| EPR (part by weight) | 0 | 1 | 1.5 | 2.5 | 5 | 2.5 | 5 | 7.5 | 30 |
| Hindered phenol stabilizer (part by weight) | 0.2 | 0.2 | 0.2 | 0.2 | 0.2 | 0.2 | 0.2 | 0.2 | 0.2 |
| EPR/SBS | 0/1 | 0.03/1 | 0.05/1 | 0.1/1 | 0.2/1 | 0.08/1 | 0.2/1 | 0.25/1 | 1/0 |
| Adhesive/styrenic layer adhesion (P/LI) | 0.06 | 0.06 | 0.08 | 0.13 | 0.07 | 0.10 | 0.11 | 0.12 | 0.02 |

We claim:

1. An adhesive composition comprising, based on the composition weight, from 30% to 65% of a polyolefin; 27.5 to 35% of a conjugated diene-based elastomer; 2.5% to 7.5% of an olefin elastomer; and 0.5% to 25% of a maleated polyolefin, wherein the composition has a weight ratio of olefin elastomer/conjugated diene-based elastomer within the range of 0.1 to 0.25, wherein the conjugated diene-based elastomer has not been hydrogenated wherein the conjugated diene-based elastomer comprises a butadiene-styrene block copolymer.

2. The composition of claim 1, wherein the weight ratio of olefin elastomer/conjugated diene-based elastomer is within the range of 0.1 to 0.15.

3. The composition of claim 1, wherein the polyolefin is selected from the group consisting of polyethylenes, polypropylenes, polybutenes, and mixtures thereof.

4. The composition of claim 1, wherein the olefin elastomer is selected from the group consisting of ethylene-propylene rubbers, ethylene-propylene-diene monomer rubbers, elastomeric polypropylenes, polyethylene plastomers, and mixtures thereof.

5. The composition of claim 1, wherein the olefin elastomer is an ethylene-propylene rubber.

6. The composition of claim 1, wherein the conjugated diene-based elastomer is a styrene-butadiene-styrene triblock copolymer.

7. A multilayer film or sheet comprising an adhesive layer of the composition of claim 1.

8. The multilayer film or sheet of claim 7, which comprises a styrenic polymer layer bonded to the adhesive layer.

9. The multilayer film or sheet of claim 8, wherein the styrenic polymer is selected from the group consisting of polystyrenes, high-impact polystyrenes, styrene-acrylonitrile copolymers, styrene-butadiene-acrylonitrile copolymers, styrene-olefin copolymers, styrenemaleic anhydride copolymers, styrene-acrylate copolymers, and mixtures thereof.

10. The multilayer film or sheet of claim 8, wherein the styrenic polymer is selected from the group consisting of polystyrene, high-impact polystyrene, and mixtures thereof.

11. The multilayer film or sheet of claim 8, which further comprises a polyolefin layer, wherein the adhesive layer is bonded to the polyolefin layer and the styrenic polymer layer.

12. The composition of claim 1, wherein the maleated polyolefin is a maleated HDPE.

13. The composition of claim 1, wherein the polyolefin is a LLDPE.

14. The composition of claim 1, comprising 27.5 to 31% of the conjugated diene-based elastomer.

15. The composition of claim 1, comprising 27.5 to 30% of the conjugated diene-based elastomer.

* * * * *